United States Patent
Janson et al.

(10) Patent No.: US 7,448,977 B2
(45) Date of Patent: Nov. 11, 2008

(54) MOTOR VEHICLE TRANSAXLE HAVING A DIFFERENTIAL MECHANISM CONTROLLED BY AN ON-DEMAND CLUTCH

(75) Inventors: David Janson, Plymouth, MI (US); Andy Perakes, Canton, MI (US); Gregory Goleski, Warren, MI (US); Dennis Person, Canton, MI (US); Larry Deutsch, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 332 days.

(21) Appl. No.: 11/334,324

(22) Filed: Jan. 18, 2006

(65) Prior Publication Data
US 2007/0093347 A1 Apr. 26, 2007

Related U.S. Application Data

(63) Continuation-in-part of application No. 11/255,793, filed on Oct. 21, 2005, now Pat. No. 7,309,301.

(51) Int. Cl.
*F16H 48/06* (2006.01)
(52) U.S. Cl. ..................................... 475/200
(58) Field of Classification Search ................. 475/160, 475/200, 202–206, 221, 222, 231, 249, 237–239
See application file for complete search history.

(56) References Cited

U.S. PATENT DOCUMENTS

| | | | |
|---|---|---|---|
| 3,894,446 A * | 7/1975 | Snoy et al. ...................... 475/88 |
| 4,763,749 A * | 8/1988 | Miura et al. ................. 180/249 |
| 4,838,764 A | 6/1989 | Murota |
| 4,862,768 A * | 9/1989 | Iwatsuki et al. ................ 475/86 |
| 5,131,902 A | 7/1992 | Pierce |
| 5,178,027 A | 1/1993 | Kobayashi et al. |
| 5,520,589 A * | 5/1996 | Dewald et al. ............... 475/231 |
| 5,951,426 A * | 9/1999 | Forrest ......................... 475/88 |
| 6,752,742 B2 | 6/2004 | Shigeta et al. |
| 6,878,085 B2 | 4/2005 | Matsuno |
| 7,104,380 B2 * | 9/2006 | Bishop et al. ........... 192/85 AA |
| 7,104,912 B2 * | 9/2006 | Morgensai ................... 475/231 |

(Continued)

FOREIGN PATENT DOCUMENTS

DE     DE. 3886872 T2     4/1989

(Continued)

*Primary Examiner*—Roger Pang
(74) *Attorney, Agent, or Firm*—David B. Kelley; MacMillan, Sobanski & Todd, LLC

(57) ABSTRACT

A transaxle for transmitting power to output at multiple speed ratios includes halfshafts having a portion located in a transaxle case and a second portion extending toward a wheel. A differential mechanism located in the case transmits power between the output and differentially to the halfshafts. A clutch driveably secured to the output and connectable to one of the halfshafts for controlling the magnitude of a speed differential between a speed of the output and a speed of the halfshaft includes a cylinder and a piston moveable in the cylinder. A hydraulic system includes a passage located adjacent a halfshaft and hydraulically communicating an inlet and the cylinder, the inlet being sealed at axially opposite sides against passage of fluid by a seal rings located in a wall that surrounds the passage.

11 Claims, 8 Drawing Sheets

U.S. PATENT DOCUMENTS

2001/0035323 A1    11/2001  Porter
2002/0144851 A1*   10/2002  Porter .................. 180/247

FOREIGN PATENT DOCUMENTS

| | | |
|---|---|---|
| EP | 0311140 A2 | 4/1989 |
| EP | 0359924 A1 | 3/1990 |
| EP | 0480887 | 4/1992 |
| EP | 0524707 | 1/1993 |
| GB | 2189854 | 11/1987 |
| GB | 2431442 | 4/2007 |
| JP | 402092729 | 4/1990 |
| JP | 402290724 | 11/1990 |
| JP | 363176723 | 11/1994 |

* cited by examiner

MOTOR VEHICLE TRANSAXLE HAVING A DIFFERENTIAL MECHANISM CONTROLLED BY AN ON-DEMAND CLUTCH

CROSS-REFERENCE TO RELATED APPLICATION

This application is a continuation-in-part of the U.S. patent application Ser. No. 11/255,793, filed Oct. 21, 2005, now U.S. Pat. No. 7,309,301.

BACKGROUND OF THE INVENTION

The present invention relates generally to a transaxle for transmitting power continually to the front wheels of a motor vehicle. More particularly, the invention pertains to a transaxle that contains an inter-wheel differential and an actively controlled, on-demand clutch.

In the powertrain of an all-wheel drive motor vehicle, whose engine and transaxle are transversely mounted in an engine compartment at the front of the vehicle, it is conventional for the transaxle case to contain a bevel-pinion differential mechanism, which is driven from the transmission's output and is driveably connected to the front halfshafts. The space that is enclosed by the transaxle case is relatively small. But an open, bevel gear differential mechanism requires a relatively large volume in the transaxle case. To overcome this difficulty, an additional component, a rear drive unit (RDU) such as a transfer case, is located in the driveline between the transaxle and a rear differential. The RDU contains an on-demand transfer clutch assembly, which transmits a portion of the torque to the rear axles depending on the degree to which the clutch is slipping or fully engaged.

The on-demand clutch couples a rear drive shaft to the transaxle output. These coupler assemblies require a pump, hydraulic control bodies, electronic controllers and lubrication systems, which are located in the transaxle, to control and actuate the on-demand clutch in the RDU. If, however, the components that produce the function of the RDU or transfer case could be integrating with the transaxle case, the powertrain would have fewer components, lower cost and improved operating reliability.

Current front-wheel drive vehicles that have no all-wheel drive capability use an open differential mechanism in the transaxle to transmit power differentially to the front wheels. When one front wheel is on a low friction surface, that wheel will tend to spin freely reducing vehicle traction on the road surface. Integrating a clutch between the differential's outputs to the right-hand side and left-hand side halfshafts provides a component that can be controlled to reduce wheel slip, thereby improving vehicle traction.

The clutch could be configured so that it controls the magnitude of torque transmitted between the differential's input and one of the side outputs or both outputs.

The differential mechanism could be a bevel gear differential or a compound planetary gearset. The on-demand clutch could be controlled hydraulically from the same controls used to operate the automatic transaxle.

SUMMARY OF THE INVENTION

A transaxle for transmitting power to output at multiple speed ratios includes halfshafts having a portion located in a transaxle case and a second portion extending toward a wheel. A differential mechanism located in the case transmits power between the output and differentially to the halfshafts. A clutch driveably secured to the output and connectable to one of the halfshafts for controlling the magnitude of a speed differential between a speed of the output and a speed of the halfshaft includes a cylinder and a piston moveable in the cylinder. A hydraulic system includes a passage located adjacent a halfshaft and hydraulically communicating an inlet and the cylinder, the inlet being sealed at axially opposite sides against passage of fluid by seal rings located in a wall that surrounds the passage.

The differential mechanism according to this invention may replace the open, front differential in a transaxle case with an assembly that includes an open differential and a hydraulically controlled on-demand transfer clutch. The differential transmits torque to the right and left wheels subject to the variable torque-transmitting capacity of an on-demand clutch. The differential may include a compound planetary gearset or a bevel gear mechanism.

In front wheel drive and rear wheel drive applications, the on-demand clutch is preferably controlled hydraulically using the same control and actuation system that is used to operate an automatic transaxle or transmission, respectively, thereby eliminating redundant components, minimizing the required space, and reducing manufacturing and assembly cost.

The transfer clutch can be controlled with dual gain using one on/off solenoid, one variable force solenoid, one pressure regulator valve, and one gain control valve. The hydraulic circuit is supplied with line pressure and a controlled solenoid feed pressure. If solenoid feed is unavailable, a regulator valve is used to produce regulated solenoid feed pressure. A simpler circuit can be used for a single gain clutch.

The scope of applicability of the present invention will become apparent from the following detailed description, claims, and drawings. It should be understood, that the description and specific examples, although indicating preferred embodiments of the invention, are given by way of illustration only, since various changes and modifications to the described embodiments and examples within the spirit and scope of the invention will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
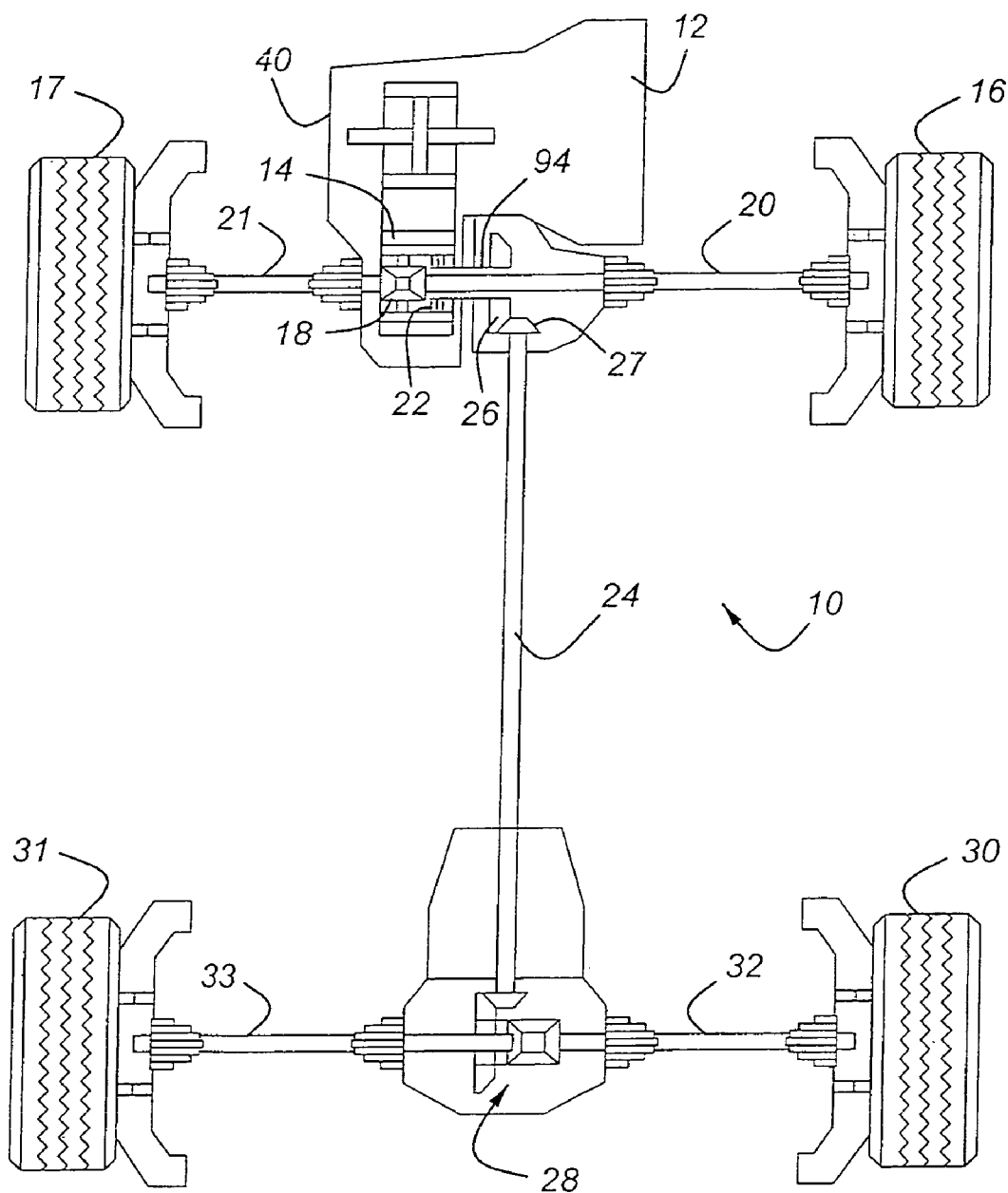
FIG. 1 is a top view of a motor vehicle driveline for transmitting power between a transaxle and the vehicle wheels.

FIG. 1 illustrates a motor vehicle powertrain 10 to which the present invention can be applied. The powertrain shown there is for an all-wheel drive vehicle whose engine and transaxle 12 are transversely mounted in an engine compartment at the front of the vehicle. The transaxle 12 produces multiple forward and reverse ratios of the speed of its output 14, which is continuously driveably connected to front wheels 16, 17, to the speed of its input, which is driveably connected to an engine crankshaft.

An inter-wheel differential mechanism 18, located in the transaxle case, transmits power differentially to a right-side halfshaft 20 and to a left-side halfshaft 21, which are connected to the wheels 16, 17, respectively. An on-demand transfer clutch 22, also located in the transaxle case, transmits power selectively between the transaxle output 14 and driveshaft 24 through a bevel pinion 26 and a mating bevel gear 27 secured to the driveshaft. The degree to which clutch 22 is engaged, slipping or disengaged determines the torque capacity of the clutch and the magnitude of torque transmitted to the driveshaft 24. Drive shaft 24 transmits power to a rear inter-wheel differential mechanism 28, from which power is transmitted differentially to the rear wheels 30, 31 through axle shafts or halfshafts 32, 33, respectively.

Figure 2:
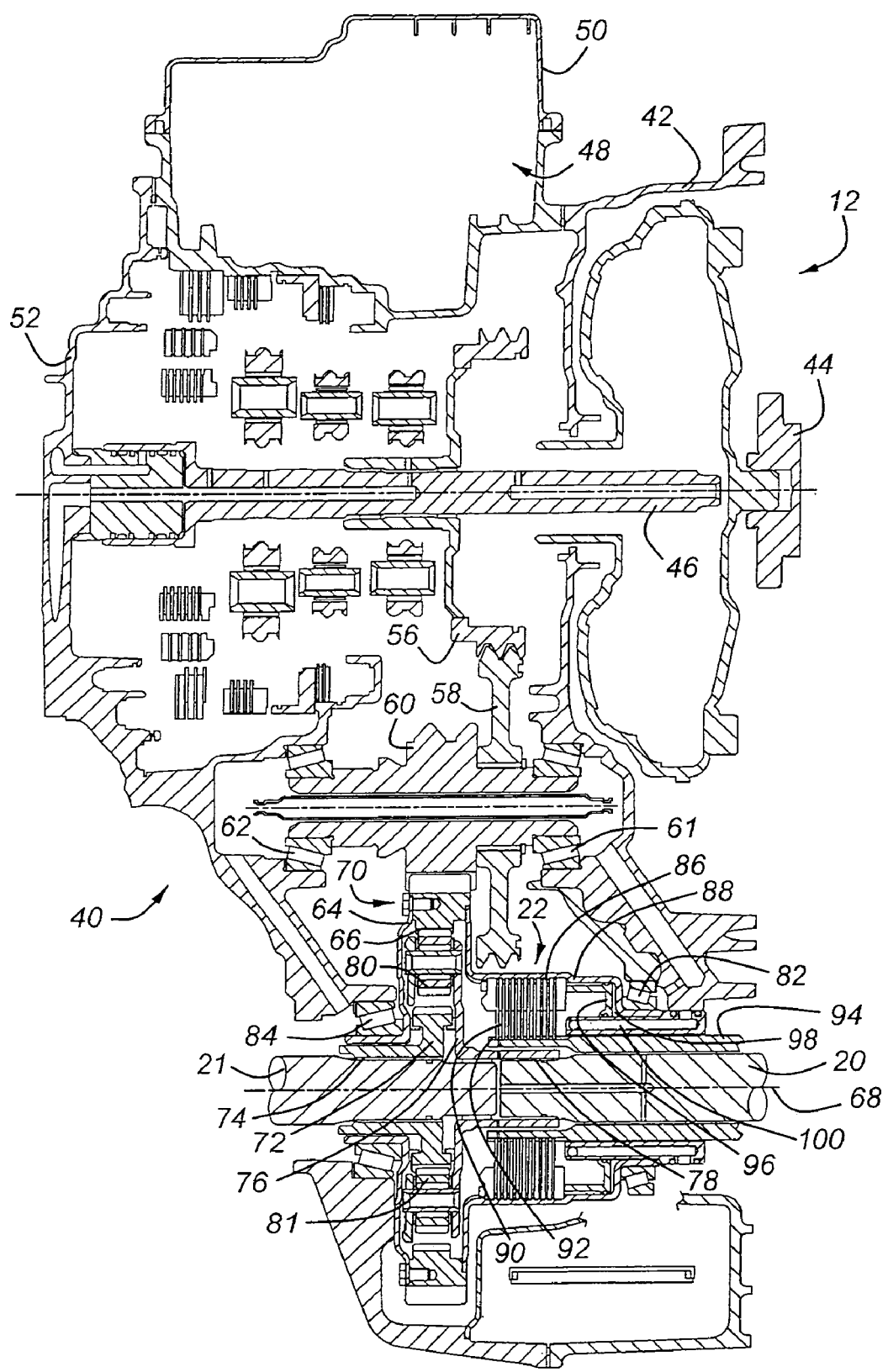
FIG. 2 is a partial cross section through the transaxle case showing details of the front inter-wheel differential mechanism and a transfer clutch.

Referring now to FIG. 2, the transaxle 12 is located in a transaxle case 40, which is preferably a machined casting of aluminum or magnesium formed in several case sections secured mutually at hydraulically sealed, bolted connections. A torque converter case section 42 contains a torque converter, which produces a hydrokinetic connection between the crankshaft 44 of an engine, or the shaft of another power source, such as a motor shaft, and the transaxle input shaft 46. A valve body 48, located in a valve body case 50, which is secured to the torque converter case 42, contains hydraulic valves, solenoids that control the valves, a connection to the outlet of a hydraulic pump, hydraulic passages that carry fluid to the clutch and brakes from the valves, and other elements of a hydraulic system. A transaxle case segment 52, which is secured to the valve body case section 50, contains several planetary gear units, hydraulically actuated clutches and brakes for controlling the gear units, shafts, and mechanical components interconnecting these components. The transaxle case section 52 containing a front inter-wheel differential, the on-demand transfer clutch 22, and the front halfshafts 20, 21, is secured to the torque converter case section 42 and the gear case segment 52. The front differential may be a bevel gear differential 18, such as that shown in FIG. 1, or a planetary differential mechanism 70, such as that shown in FIG. 2.

Torque at the output 56 of the planetary gear units is transmitted to a wheel 58 supported on and secured to an intermediate shaft 60. Bearings 61, 62 support the intermediate shaft 60 as it rotates on the torque converter casing 42 and casing 52. A wheel 64, driveably connected to intermediate shaft 60, is formed at its inner radial surface with a ring gear 66, concentric about the axis 68 of the halfshafts 20, 21.

The front inter-wheel differential illustrated in FIG. 2 is a planetary differential mechanism 70, which includes a sun gear 72, driveably connected through a spine 74 to the left-side halfshaft 21; a planet pinion carrier 76, driveably secured by a spline 78 to the right-side halfshaft 20; and two sets of planet pinions 80, 81. The members of pinion set 80 are in continuous meshing engagement with ring gear 66 and the members of pinion set 81, and are rotatably supported on the carrier 76. The members of pinion set 88 are in continuous meshing engagement with sun gear 72 and the members of pinion set 80, and are rotatably supported on the carrier 76.

Preferably the ratio of the pitch diameter of ring gear 66 to the pitch diameter of sun gear 72 is 2.0, i.e., the number of ring gear teeth to the number of sun gear teeth is 2.0. With this preferred ratio, one-half of the magnitude of torque transmitted through the differential mechanism 70 is transmitted to the right-side halfshaft 20 and one-half of that torque is transmitted to the left-side halfshaft 21.

The on-demand clutch 22 includes plates 86, splined to the inner surface of a drum 88, which is secured to output member 64, and friction discs 90, interleaved with the plates 86 and splined at 92 to a rear drive output sleeve shaft 94. The ring 64, sun gear 72, both halfshafts 20, 21, and rear output shaft 94 are rotatably supported on the cases 42, 54 by bearings 82, 84. Bevel pinion 26 is secured to the rear output shaft 94, and the bevel pinion 27 is in continuous meshing engagement with bevel gear 26, which transmits power to the rear wheels 30, 31 through driveshaft 24 and the rear differential mechanism 28.

The transfer clutch 22 includes a hydraulically actuated piston 96, which moves leftward forcing the friction discs 90 and plates 86 into mutual frictional engagement when the hydraulic cylinder 98 is pressurized. The clutch cylinder 98 is pressurized and vented through a passage 100 formed of the hydraulic system that controls operation of the transaxle. When cylinder 98 is vented, piston 96 moves rightward allowing the transfer clutch 22 to disengage. In operation, the transfer clutch 22 may slip or fully engage, but the degree to which it is partially or fully engaged determines the magnitude of torque transmitted to the rear wheels 30, 31, and to the front wheels. But the magnitude of torque transmitted to each of the front halfshafts 20, 21 and front wheels 16, 17 is equal.

Figure 3:
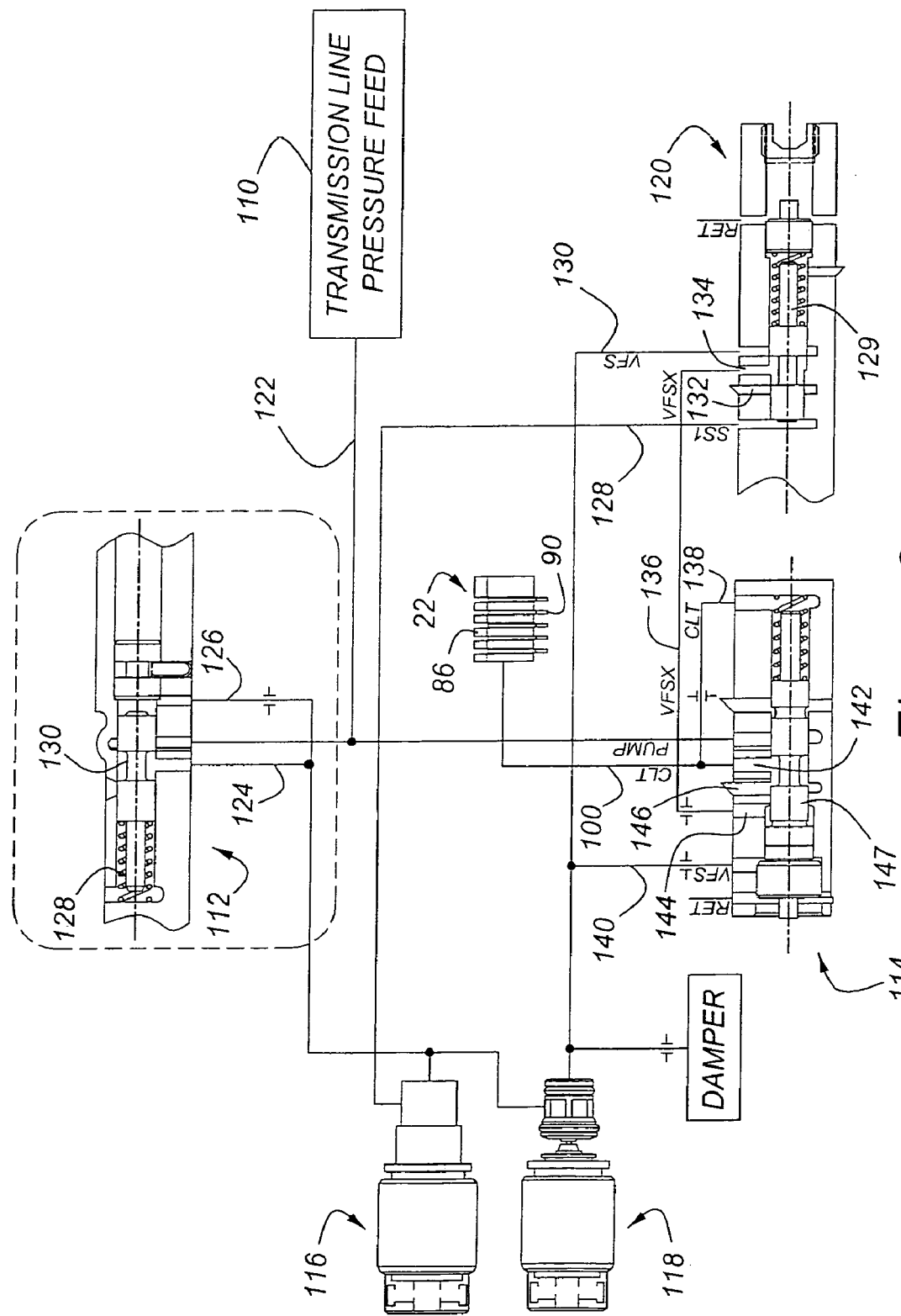
FIG. 3 is schematic diagram of a hydraulic system for controlling the transfer clutch.

A hydraulic system that controls actuation of the on-demand clutch 22 is illustrated in FIG. 3. The hydraulic system is located in the transaxle case 52, particularly in the valve body 48 housed in the valve body case segment 50. Hydraulic pressure at the pump outlet 110 is communicated to a solenoid feed pressure regulator valve 112 and to a transfer clutch pressure regulator valve 114. Regulated solenoid feed pressure produced at the output 124 of the regulator valve 112 is applied to an on-off solenoid valve 116, whose output is either at the regulated pressure or is zero, and to a variable force solenoid valve 118, whose output varies with the magnitude of current supplied to the solenoid that actuates valve 118. Transfer clutch 22 is further controlled by a gain control valve 120.

Pressure at the pump outlet is carried through line 122 to the pressure regulator valve 112. Regulated outlet pressure in line 124 is fed back through line 126 tending to close the valve and to balance the force of a compression spring 128 operating on the spool 130 and tending to open the valve. In this way, valve 112 regulates the magnitude of outlet pressure in line 124 that is communicated to valves 116, 118.

Gain control valve 120 has a high gain state and a low gain state. When valve 116 opens line 124 to line 128 thereby communicating regulated pressure to the SS1 port of valve 120, the low gain state is produced, in which spool 129 is forced rightward against its compression spring and opens a connection between the outlet of valve 118 through line 130 and line 136. The low gain state produces a variable force in line 136.

When valve 116 closes line 124 to line 128 thereby preventing communicating of regulated pressure to the SS1 port of valve 120, the high gain state is produced, in which spool 129 is forced leftward by the compression spring, closing a connection between the outlet of valve 118 and line 136 and opening a connection between the VFSX port 134 and exhaust port 132. The high gain state produces zero pressure in line 136.

Clutch pressure regulator valve 114 includes a VFS port connected by line 140 to valve 118, a VFSF port 144 connected by line 136 to valve 120, an exhaust port 146, an outlet port 142 connected by line 100 to the cylinder 98 of transfer clutch 22, a feedback port connected by line 138 to the clutch pressure outlet 142, and a pump port connected by line 122 to the pump outlet. When gain control valve 120 is in the high gain state, pressure at port 144 is zero, VFS pressure forces the spool 147 rightward against the force applied by the compression spring, causing the valve to modulate outlet port 142 between connections to exhaust port 146 and the pump port depending on the magnitude of VFS pressure and the outlet pressure.

When gain control valve 120 is in the low gain state, pressure at port 144 is present on the differential area of the spool 147, thereby reducing the net effect of the VFS pressure force tending to move the spool rightward against the force applied by the compression spring. This causes a lower magnitude of clutch pressure as valve 114 modulates outlet port 142 between connections to exhaust port 146 and the pump port.

Figure 4:
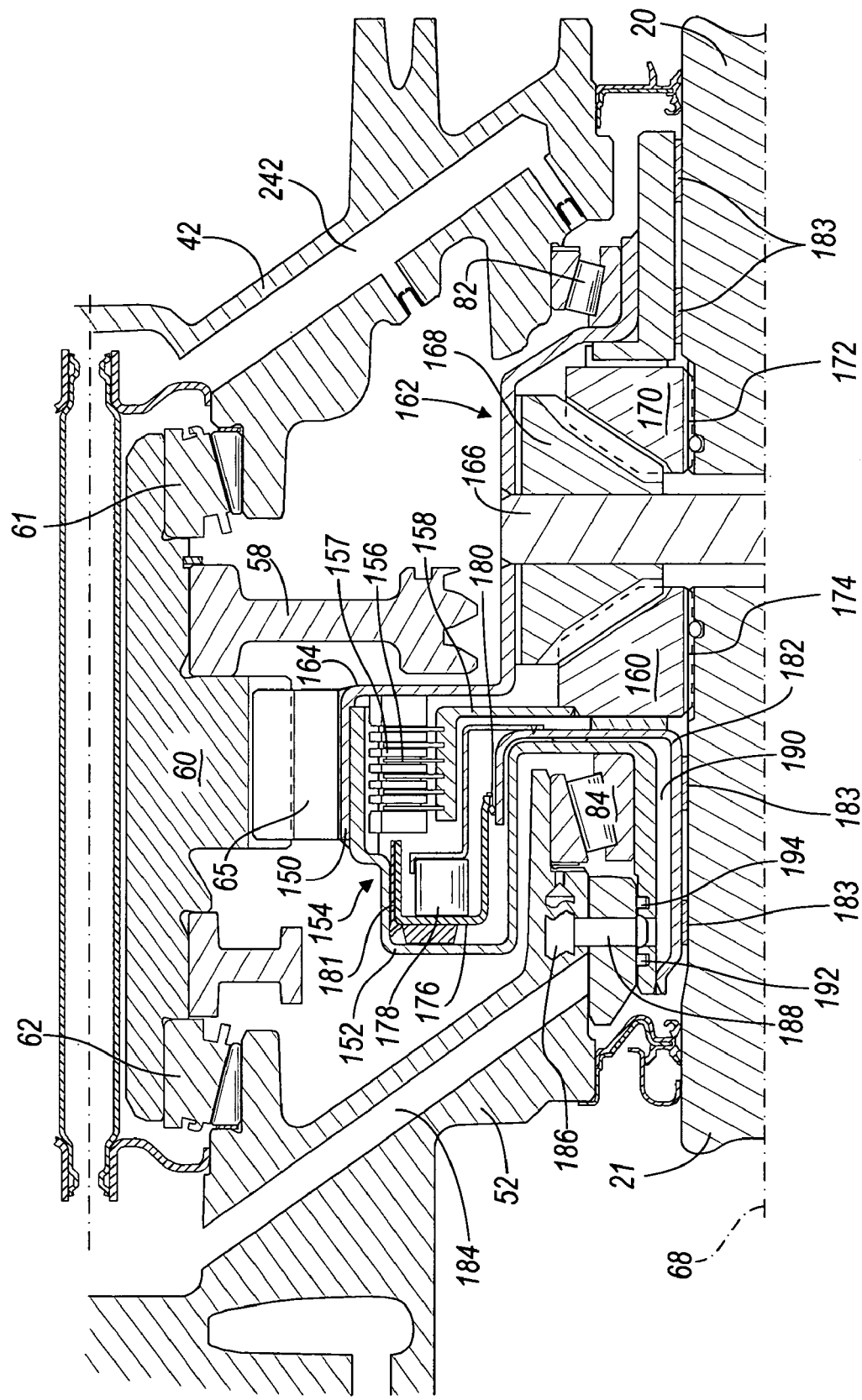
FIG. 4-7 are cross sections through the transaxle case showing details of a bevel gear differential mechanism and a clutch for controlling the differential.

Referring now to the inter-wheel differential shown in FIG. 4, the transaxle output wheel 65, which is driveably connected to intermediate shaft 60, is formed with splines 150 at its radial inner surface. The splines 150 driveably connect a hydraulic cylinder 152 to output wheel 65 and provide a surface onto which friction discs of clutch 154 are secured. The friction discs 156 are interleaved with the spacer plates 157, which are splined at their radial inner surface to the flange of a disk 158, which is secured, preferably by welding, to the left-hand bevel gear 160 of a differential mechanism 162.

A connecting member 164 is also driveably connected by the spline 150 and extends to the pin 166 of the differential mechanism 162, to which it is secured for rotation as a unit. Pin 166 passes through center bevel pinions 168 located at opposite lateral sides of the central axis 68, and in continuous meshing engagement with the left side bevel pinion 160 and the right side bevel pinion 170. The right side bevel pinion 170 is splined at 172 to the right side half-shaft 20, and the left side bevel pinion 160 is splined at 174 to the left side half-shaft 21.

A piston 176, located within cylinder 152, actuates clutch 154 toward engagement. The piston 176 moves rightward when a space between the piston and cylinder is pressurized, and, when that space is vented, it moves leftward in response to the force produced by a return spring 178. Piston 176 carries a dynamic seal 180, which moves on the leg of a channel 182 as the piston moves in the cylinder 152. A second seal 181 also hydraulically seals the space between the cylinder and piston. Channel 182 is supported by bushings 183 for rotation on the outer surface of half-shaft 21.

Hydraulic passage 184 formed in casing 52 supplies lubricant to bearing 84. Passages 186 and 188, communicate pressurized fluid to a passage 190, which extends axially and radially outward to the space in cylinder 152 behind piston 176. When pressure within passages 186, 188, 192 is high due to a connection to a fluid pressure source, piston 76 moves rightward forcing the clutch discs 156 into frictional contact with spacer plates 157, thereby producing a drive connection between output wheel 65 and side bevel gear 160. The torque transmission capacity of clutch 154 varies with magnitude of pressure applied to cylinder 152. Return spring 178 acts continually in opposition to the pressure force developed on the face of piston 176 and returns the piston to the disengaged position shown in FIG. 4 when the cylinder 152 is vented. Seals 192, 194, located at opposite axial sides of radial passage 190 and adjacent halfshaft 21, prevent hydraulic fluid leaking past the seals.

In operation, power is transmitted from output wheel 65 to the differential mechanism 162. Speed across clutch 154, called slip, varies with torque capacity of the clutch 154 and the magnitude of its actuating pressure. The speed difference across differential 154 between the half-shafts 20, 21 is controlled by varying the torque capacity of the clutch.

Figure 5:
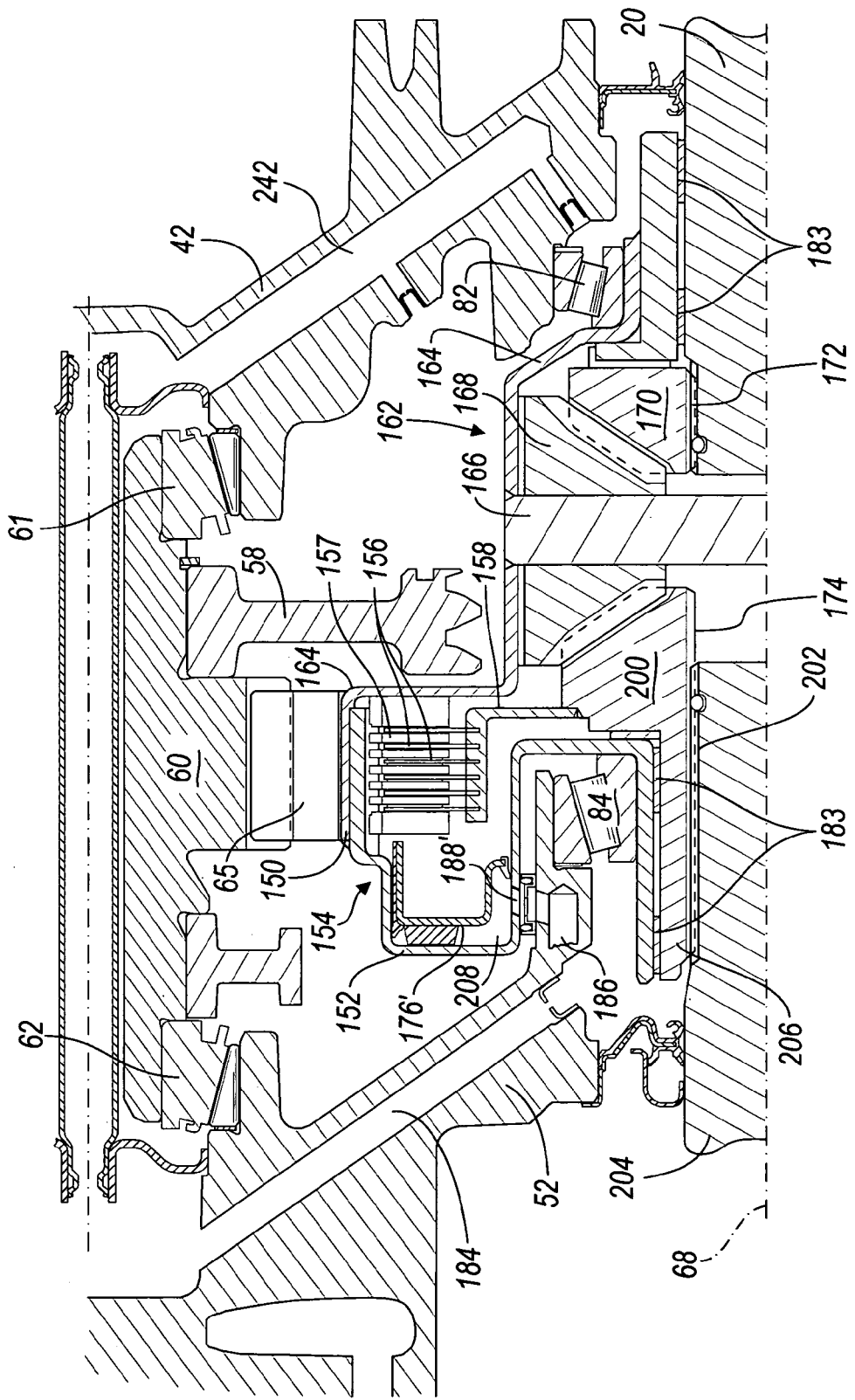

In the embodiment of FIG. 5, hydraulic cylinder 152, spacer plates 156 of clutch 154, and the connecting member of 164 engage the spline 150 formed on the inner radial surface of output wheel 65. The left side bevel gear 200 is in continuous meshing engagement with the center bevel pinion 168, is splined at 202 to the left half-shaft 204, and is secured to disc 158, to which the spacer plates 157 of clutch 154 are splined. Piston 176, located within cylinder 152, moves rightward when actuated by hydraulic pressure, thereby engaging clutch 154 by forcing its friction discs 156 into frictional contact with the spacer plates 157, thereby producing a drive connection between output wheel 65 and the left side bevel gear 204. The source of hydraulic control pressure communicates through passage 186 and radial passage 188' with the hydraulic cylinder 152.

Figure 6:
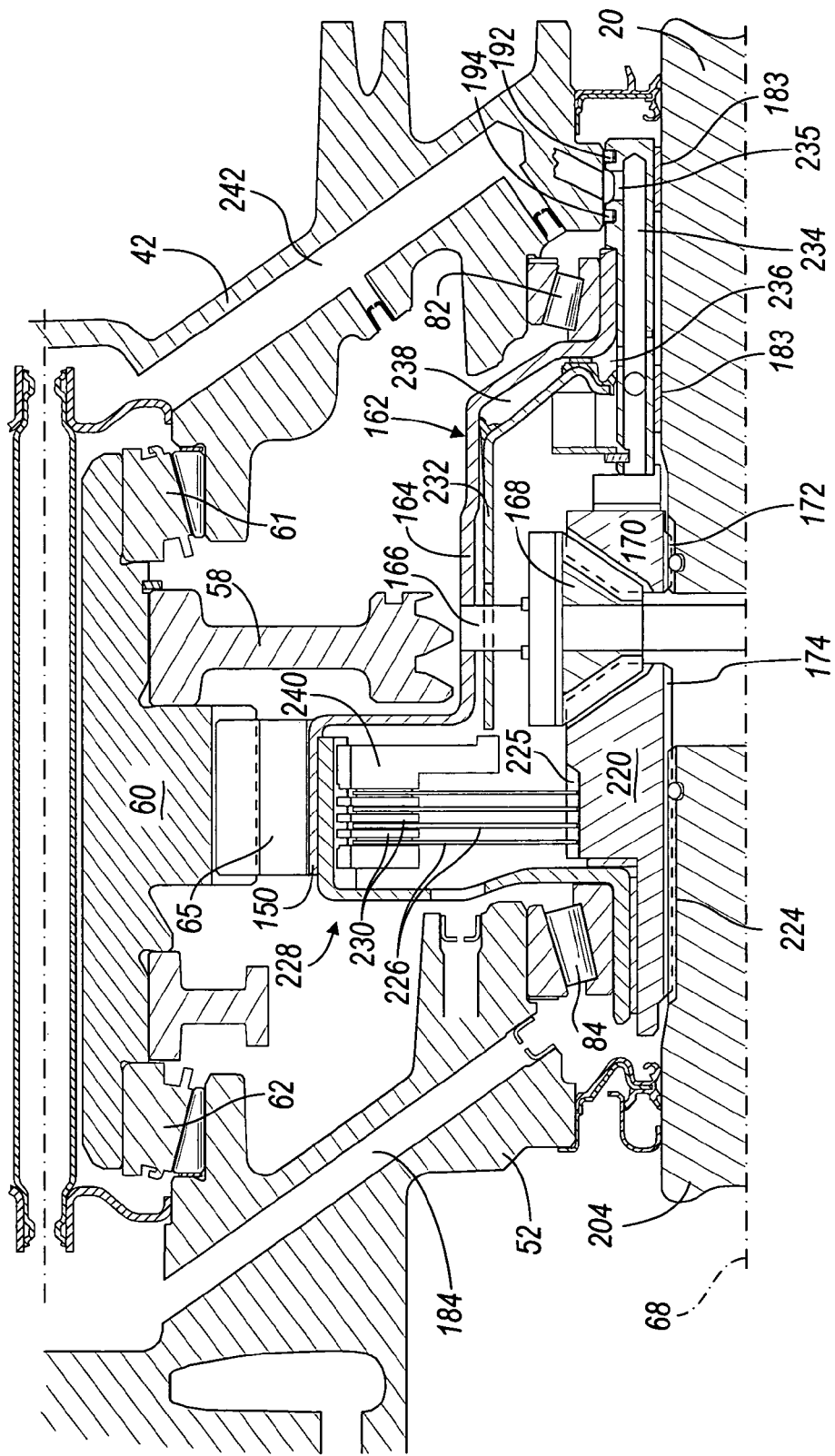

In the embodiment of FIG. 6, the left side bevel gear 220 is in continuous meshing engagement with the center bevel gears 168, is splined at 224 to left half-shaft 204, and is splined at 225 to the friction discs 226 of the clutch 228. The clutch blocker plates 230, interleaved with the spacer plates 226, are splined to the inner radial surface of output wheel 65. Piston 232 contacts a blocker plate 240 that when actuated forces the friction discs 226 into engagement with the spacer plates 230 to produce a drive connection between bevel gear 220 and the output wheel 65. Passage 184 supplies hydraulic lubricant to bearing 84, and passage 242 supplies hydraulic lubricant to bearing 82. Actuating pressure communicates a source of high pressure fluid through passages 234, 235, 236 to cylinder 238, in which piston 232 moves. Seals 192, 194, located at opposite axial sides of radial passage 235 and adjacent halfshaft 20, prevent hydraulic fluid from leaking past the seals.

Figure 7:
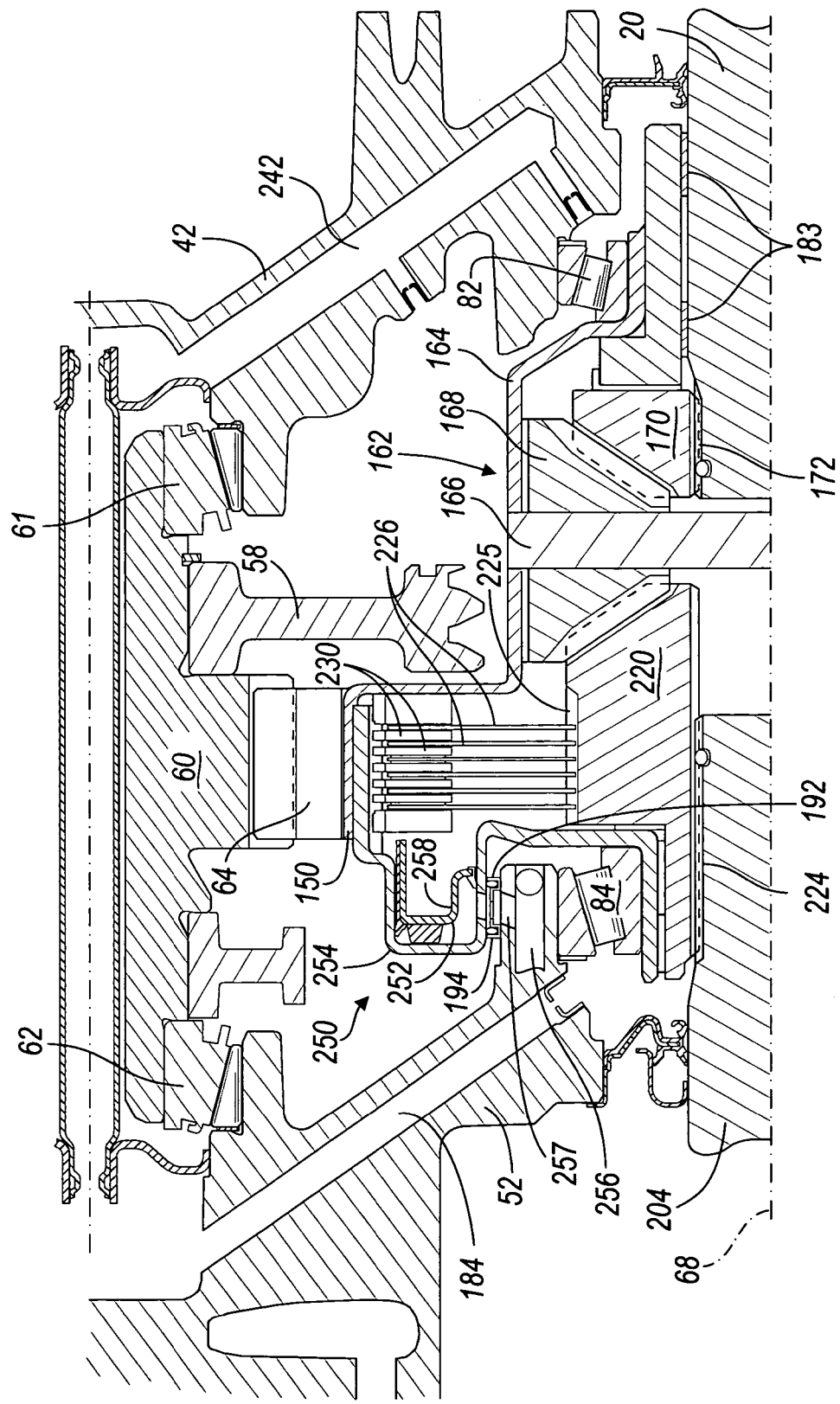

In embodiment of FIG. 7, the left side bevel gear 220 is continually engaged with center bevel pinion 168, is splined at 224 to the left halfshaft 204, and is splined at 225 to the friction discs 226 of the clutch 250. Clutch 250 is actuated by a piston 252, which that reciprocates within a hydraulic cylinder 254. Cylinder 254 is connected to a source of hydraulic control pressure through axial passage 256, and radial passages 257 formed in housing 52. Bearing 82 is lubricated through passage 242 formed in housing 42, and bearing 84 is lubricated through passage 184 formed in housing 52. Seals 192, 194, located at opposite axial sides of radial passage 258, but relatively distant from halfshaft 20, prevent hydraulic fluid leaking past the seals.

Figure 8:
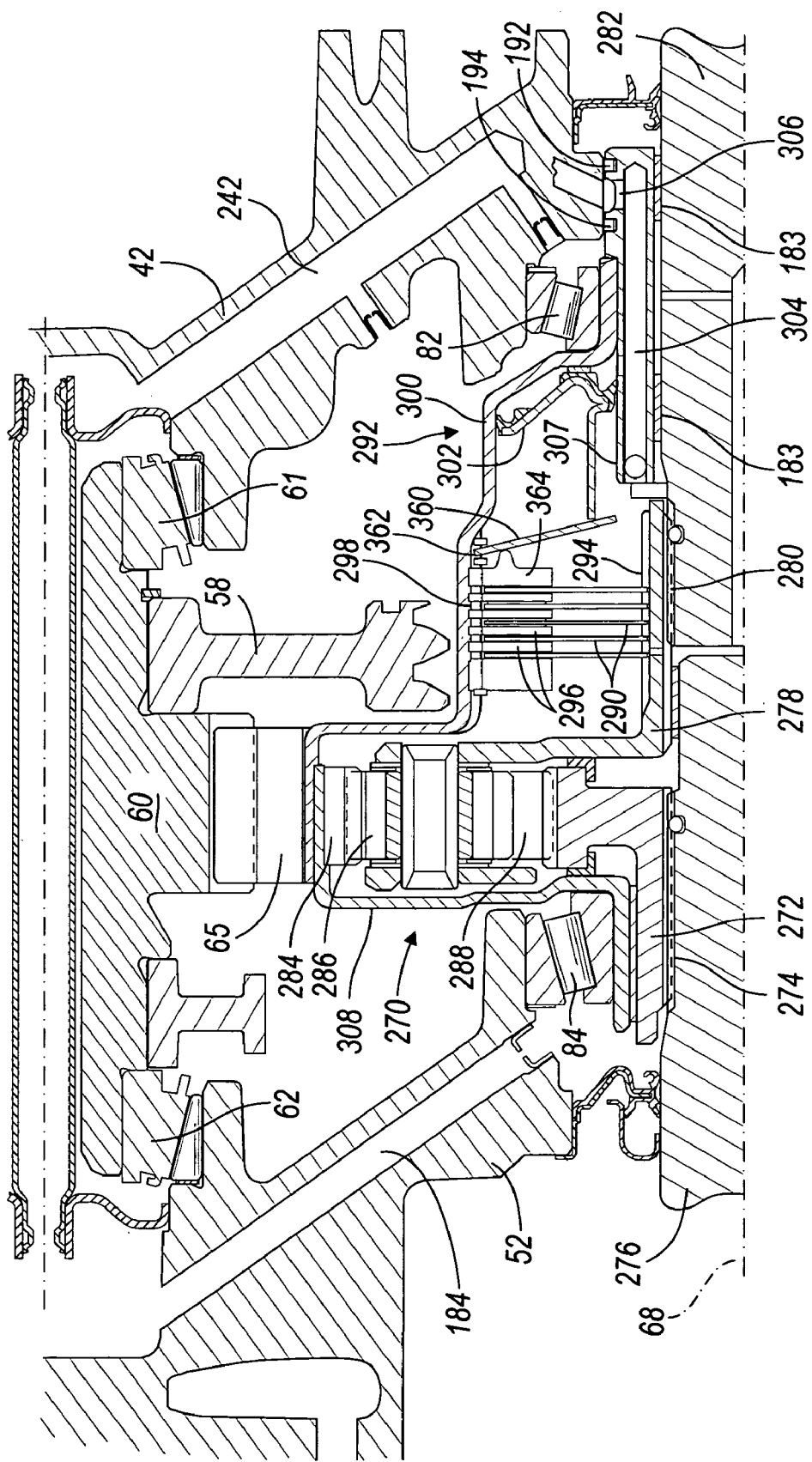
FIG. 8 is a cross section through the transaxle case showing details of a compound planetary differential mechanism and a clutch for controlling the differential.

The differential mechanism of the embodiment shown in FIG. 8 is a dual planetary gear unit 270 having a sun gear 272 splined at 274 to the left side halfshaft 276. A planet pinion carrier 278 is splined at 280 to the right side halfshaft 282. A ring gear 284, driveably secured to output wheel 65 is in continuous meshing engagement with a set of planet pinions 286, rotatably supported on carrier 278. A second set of planet pinions 288, also rotatably supported on carrier 278, are in continuous meshing engagement with sun gear 272 and with the first set of planet pinions 286.

Friction discs 290 of the clutch 292 are splined at 294 to the radial outer surface of pinion carrier 278. The spacer plates 296 of the clutch 292 are splined at 298 to the radial inner surface of a hydraulic cylinder 300. An actuating piston 302 moves within cylinder 300 when the space behind piston 302 is alternately pressurized through passages 304, 306 from a source of hydraulic fluid pressure and as the cylinder is vented through those passages. Cylinder 300 and connecting member 308 are driveably secured by splines to output wheel 65 and rotate at the speed of wheel 64. Cylinder 300 is supported by bearing 82 on housing 42, and connecting member 308 is supported by bearing 84 on housing 52. Passages 184 and 242 carry hydraulic lubricant to bearings 84 and 82, respectively. Seals 192, 194, located at opposite axial sides of radial passage 306 adjacent halfshaft 282, prevent hydraulic fluid from leaking past the seals. Hydraulic control pressure is supplied through passages 304, 306 alternately to actuate piston 302 and to vent cylinder 300. Passages 304, 306 are formed in a cylinder 307, which is rotatably supported by bushings 183 on the radial outer surface of halfshaft 282.

Piston 302 applies its actuating force to the clutch 292 in opposition to a Belleville spring 360, which is supported pivotably at 362 on the inner surface of cylinder 300 and bears against a pressure plate 364. When cylinder 300 is vented, spring 360 forces piston 302 rightward to the position shown in FIG. 8, where the clutch 292 is disengaged. The actuating piston force is amplified through the mechanical advantage produced by the leveraged condition of the spring.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A transaxle for transmitting power to the drive wheels of a vehicle, comprising:
   a transaxle case;
   a differential mechanism located in the case, including an input and transmitting power between the input and at least two halfshafts;
   a clutch located in the case, including a cylinder and a piston in the cylinder, for controlling a differential between a speed of the input and a speed of one of the halfshafts; and
   a hydraulic system located in the case, including a passage parallel to a halfshaft and a surface of the case, hydraulically communicating an inlet and the cylinder, the inlet being sealed against passage of fluid by seal rings located in a wall that surrounds the passage.

2. The transaxle of claim 1, wherein the passage is bounded by a wall located adjacent a surface of a halfshaft and a radially outer wall located adjacent a surface of the transaxle case.

3. The transaxle of claim 1, wherein the passage is bounded by a radially inner wall located adjacent an outer surface of a halfshaft and a radially outer wall located adjacent a surface of the transaxle case, the seal rings being located in the outer wall and contacting a nonrotating surface, a first seal ring located at a first side of the inlet, a second seal ring located at a second side of the inlet axially opposite the first side.

4. The transaxle of claim 1, further comprising:
   a first member driveably connected to the output and including a radially outer wall of the passage rotatably supported on the transaxle case and forming a portion of the cylinder;
   a second member secured to the first member for rotation therewith, spaced radially from the first connecting member, and including a radially inner wall of the passage located adjacent an outer surface of a halfshaft.

5. The transaxle of claim 1, further comprising:
   a first member driveably connected to the output and including a radially outer wall of the passage, the seal rings includes first and second seal rings being located in the outer wall and contacting a non rotating surface, the first seal ring located at a first side of the inlet, the second seal ring located at a second side of the inlet axially opposite the first side; and
   a second member spaced radially from the first connecting member and including a radially inner wall of the passage located adjacent an outer surface of a halfshaft.

6. The transaxle of claim 1, further comprising:
   a first member forming a portion of the cylinder, driveably connected to the output and including a radially outer wall of the passage, the seal rings includes first and second seal rings being located in the outer wall and contacting a nonrotating surface, the first sealing ring located at a first side of the inlet, the second sealing ring located at a second side of the inlet axially opposite the first side; and
   a second member spaced radially from the first connecting member and including a radially inner wall of the passage located adjacent an outer surface of a halfshaft.

7. The transaxle of claim 1, wherein the clutch further comprises:
   friction discs;
   spacer plates, a spacer plate located between successive friction discs, the discs and plates arranged in a stack;
   a blocker plate located at an end of the stack for securing the stack against movement;
   a pressure plate located at an opposite end of the stack from the blocker plate; and
   a Belleville spring supported for pivoting movement, contacting the pressure plate and actuated by the piston, the spring acting as a lever and applying a greater force to the pressure plate than a force applied to the spring by the piston.

8. The transaxle of claim 1, wherein the clutch further comprises:
   spacer plates, a spacer plate located between successive friction discs, the discs and plates arranged in a stack;
   a blocker plate located at an end of the stack for securing the stack against movement;
   a pressure plate located at an opposite end of the stack from the blocker plate; and
   a return spring contacting the piston for urging the piston away from contact with the pressure plate.

9. A transaxle for transmitting power to the drive wheels of a vehicle, comprising:
   a transaxle case;
   a differential including a bevel pinion driveably connected to an input, a bevel gear engaged with a first halfshaft, and a second bevel gear driveably connected to a second halfshaft, each gear engaged with the pinion;
   a clutch located in the case including a cylinder and a piston in the cylinder, for controlling a differential between a speed of the input and a speed of the first halfshaft; and
   a hydraulic system located in the case, including a passage parallel to a halfshaft and a surface of the case, hydraulically communication an inlet and the cylinder, the inlet being sealed against passage of fluid by seal rings located in a wall that surrounds the passage;
   a first member driveably connected to the input, supported on the case, forming a portion of the cylinder, and
   a second member secured to the first member, including a wall of the passage and located adjacent the first halfshaft.

10. The transaxle of claim 9, wherein:
   the seal rings include first and second seal rings are located in a wall and contacting a nonrotating surface, the first seal ring is located at a first side of the inlet, the second seal ring is located at a second side of the inlet axially opposite the first side; and the second member includes a radially inner wall of the passage located adjacent an outer surface of a halfshaft.

11. The transaxle of claim 9, wherein the clutch further comprises:

spacer plates, a spacer plate located between successive friction discs, the discs and plates arranged in a stack;

a blocker plate located at an end of the stack for securing the stack against movement;

a pressure plate located at an opposite end of the stack from the blocker plate; and a return spring contacting the piston for urging the piston away from contact with the pressure plate.

* * * * *